(12) United States Patent
Kirtland et al.

(10) Patent No.: US 10,279,849 B1
(45) Date of Patent: May 7, 2019

(54) SKID PLATE

(71) Applicant: Honda Motor Co., Ltd., Tokyo (JP)

(72) Inventors: Dakota D. Kirtland, Dublin, OH (US); Daniel T. Sellars, West Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/831,170

(22) Filed: Dec. 4, 2017

(51) Int. Cl.
*B62D 25/20* (2006.01)

(52) U.S. Cl.
CPC ................. *B62D 25/2072* (2013.01)

(58) Field of Classification Search
CPC .. B62D 21/11; B62D 25/2072; B62D 21/183; B62D 49/04; B62D 5/04; B62K 5/01; B62K 5/00
See application file for complete search history.

(56) References Cited

U.S. PATENT DOCUMENTS

| | | | |
|---|---|---|---|
| 4,943,092 A | 7/1990 | Haraguchi | |
| 5,855,250 A * | 1/1999 | Nishi | B62K 5/01 180/312 |
| 5,975,624 A * | 11/1999 | Rasidescu | B62D 21/183 180/311 |
| 6,702,058 B2 * | 3/2004 | Ishii | B62K 5/01 180/311 |
| 7,048,286 B2 | 5/2006 | Eppelein | |
| 7,770,907 B2 * | 8/2010 | Shimizu | B60G 3/20 280/124.134 |
| 7,950,736 B2 * | 5/2011 | Olson | B60N 2/40 180/190 |
| 8,453,775 B2 * | 6/2013 | Belzile | B60K 11/02 180/291 |
| 8,474,844 B2 * | 7/2013 | Kwon | B60G 3/20 280/124.135 |
| 8,839,901 B1 * | 9/2014 | Bradshaw | B62D 25/2072 180/346 |
| 8,944,449 B2 * | 2/2015 | Hurd | B60K 5/00 280/124.152 |
| 9,238,394 B2 | 1/2016 | Leibl | |
| 9,346,492 B2 | 5/2016 | Oshima et al. | |
| 2004/0041415 A1 * | 3/2004 | Hamm | B62D 49/04 293/115 |
| 2010/0224172 A1 * | 9/2010 | Kusa | B60K 15/03504 123/520 |
| 2012/0319389 A1 * | 12/2012 | Takahashi | B62D 21/11 280/781 |
| 2013/0056292 A1 * | 3/2013 | Kinsman | B62D 5/04 180/68.3 |
| 2014/0067215 A1 * | 3/2014 | Wetterlund | B60K 26/02 701/69 |

FOREIGN PATENT DOCUMENTS

| | | |
|---|---|---|
| CN | 203496594 U | 3/2014 |
| EP | 1966029 B1 | 9/2010 |
| WO | 2007080281 A1 | 7/2007 |

* cited by examiner

*Primary Examiner* — Hau V Phan
(74) *Attorney, Agent, or Firm* — Honda Patents & Technologies North America, LLC; Clifford B. Vaterlaus

(57) ABSTRACT

A skid plate for a powertrain component of a vehicle includes a base and first and second flanges at opposing edges of the base. The base includes a notch to form a tow point when attached to a V shaped tow frame member.

10 Claims, 10 Drawing Sheets

SKID PLATE

BACKGROUND

Skid plates are secured to the underside of off-road vehicles to protect underbody components from damaging contact or impacts with the ground, rocks, stumps, or the like during use of the vehicle. Skid plates are typically rigid and fixedly secured (e.g., welded) to the frame or body. Skid plates are designed to deflect impacts to the frame or body, and thus tend to be heavy and tend to complicate routine maintenance or repair, due to their location on the undercarriage.

There is an ongoing need for a skid plate that is lighter, smaller, and which is integrated into an assembly that provides protection to important drive components, while also facilitating routine service and providing additional utility, for example for towing.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
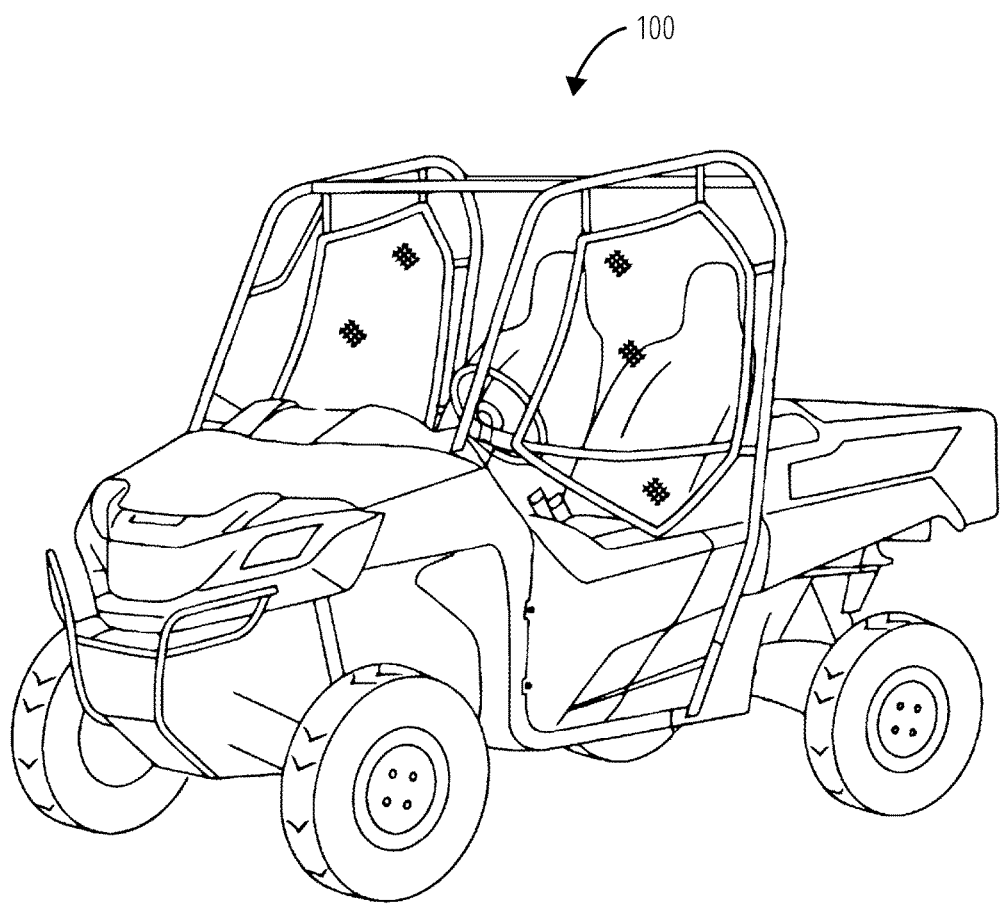
FIG. 1 illustrates an embodiment of an off road vehicle 100.

Referring to FIG. 1, an off road vehicle 100 is a type of vehicle intended to operate on harsh terrain that often includes rocks, ruts, and other obstacles. It will be appreciated that the principles of the present disclosure may be applicable to the off road vehicle 100 as well as various other types of vehicles, such as automobiles, trucks, construction or farm equipment, or the like. During operation, the off road vehicle 100 may be subjected to jarring that results in the undercarriage of the vehicle frame 200 coming into contact with foreign objects (sometimes referred to as "bottoming out"). Components of the powertrain component 204 must therefore be protected against bottoming out. It will be understood that the phrase "powertrain component" as used herein shall be construed to include a housing having parts such as an engine, transmission, or gears, including a transaxle, a differential, or a spool that does not allow differentiation of wheel rotation or speed.

Figure 2:
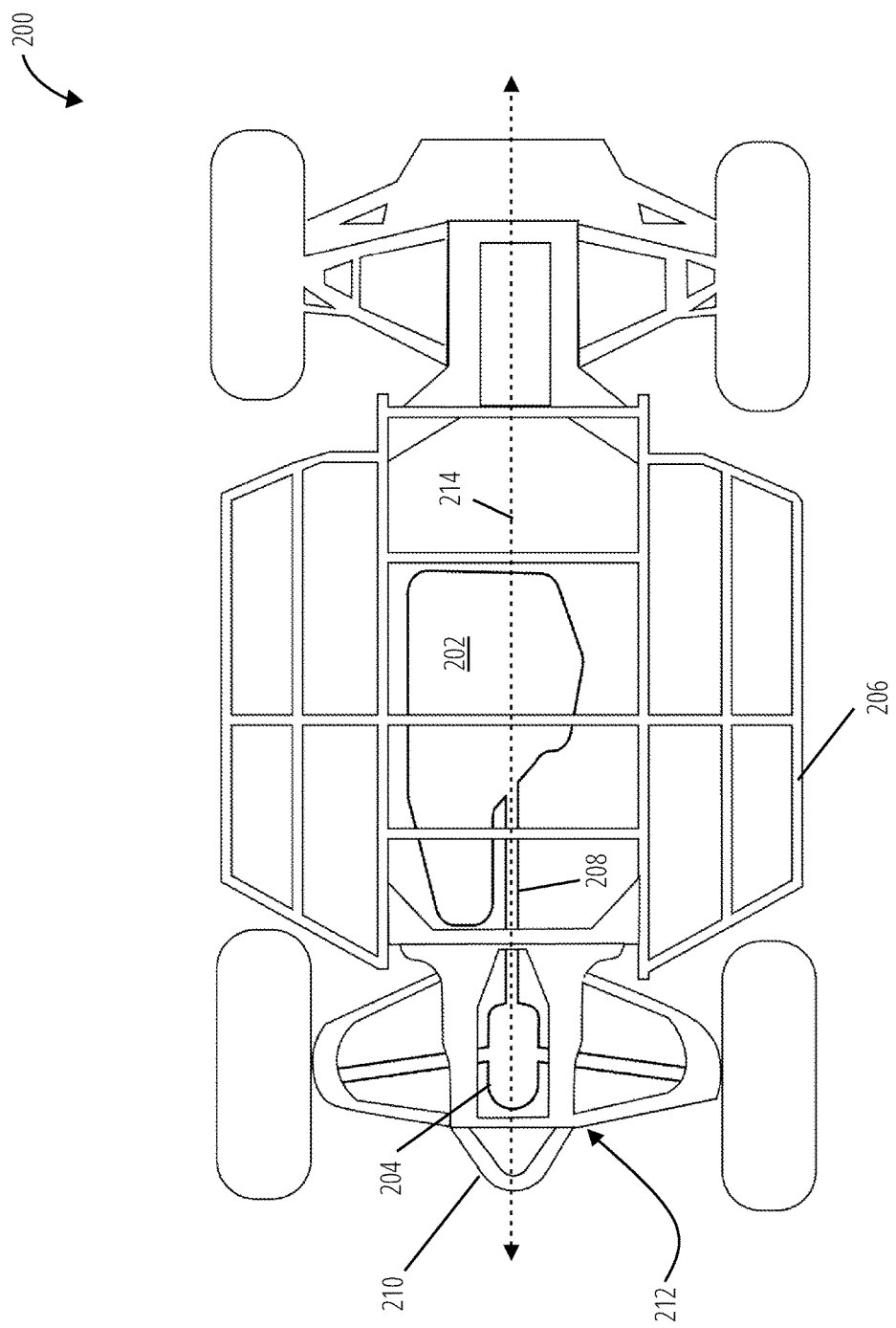
FIG. 2 illustrates a bottom view of a vehicle frame 200 of an off road vehicle 100.

Referring now to FIG. 2, a vehicle frame 200 of the off road vehicle 100 includes a drive axis 214 traversing a length of a lower frame body 206 centrally through a powertrain component 204. The drive mounting 212 engages a propeller shaft 208 to receive power from the motor 202. A tow frame member 210 is formed at a front of the drive mounting 212. The tow frame member 210 may be substantially V shaped. However, it will be understood that the tow frame member 210 may have any other suitable shape.

Figure 3:
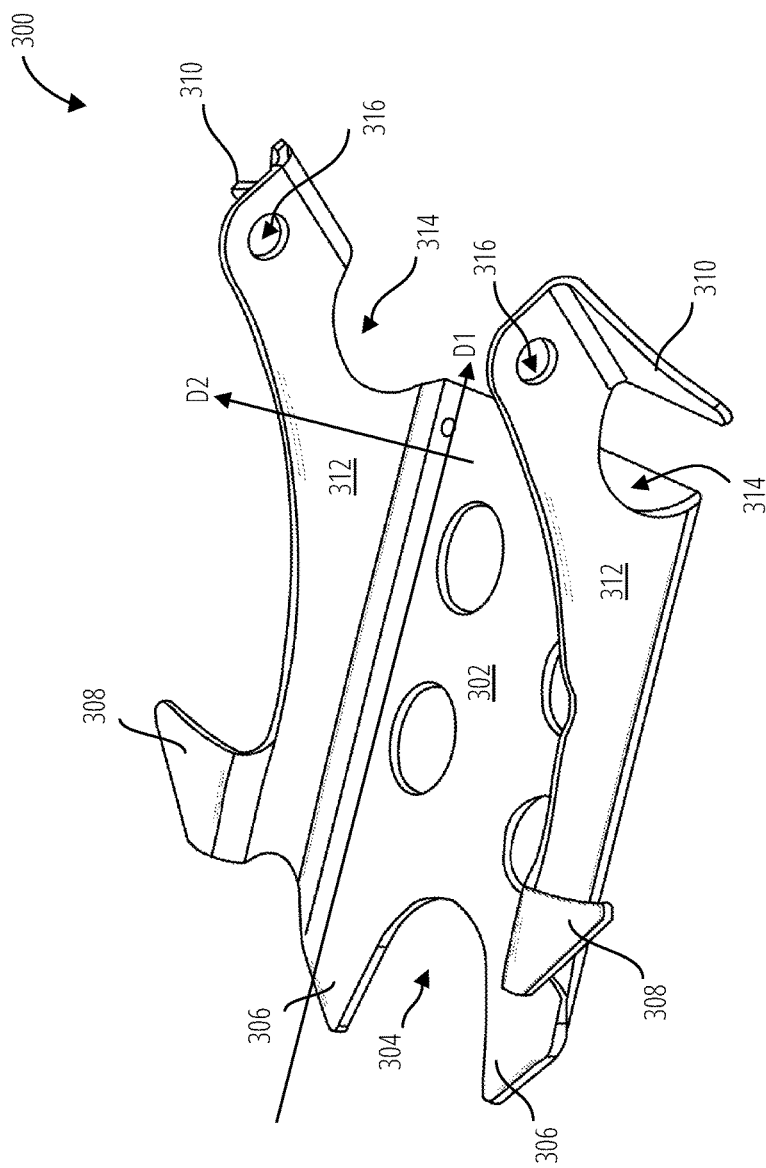
FIG. 3 is a perspective view of a skid plate 300 to protect a powertrain component 204.
Figure 4:
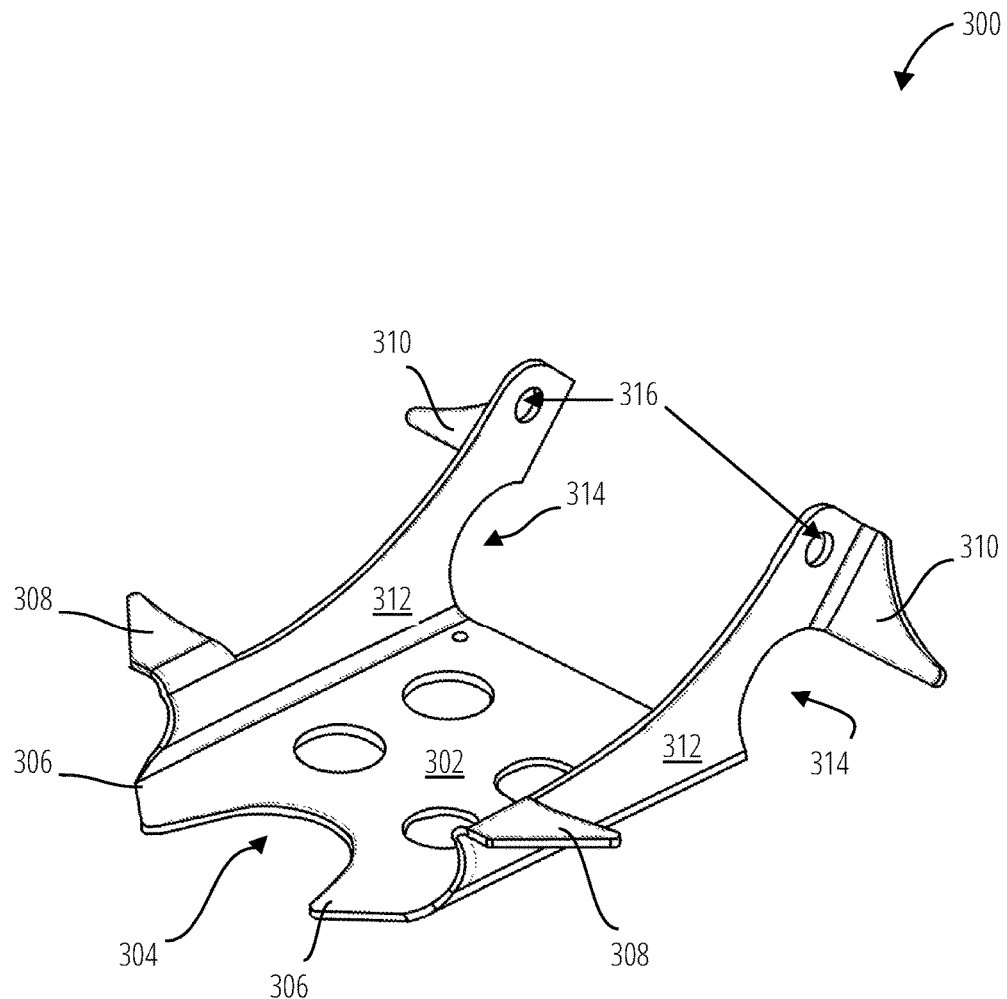
FIG. 4 illustrates the skid plate 300 in another view.

Referring now to FIGS. 3 and 4, a skid plate 300 may be utilized to protect the powertrain component 204 from damage during operation of the off road vehicle 100. In an exemplary embodiment, a skid plate 300 for the powertrain component 204 may include a base region 302 (a.k.a., the "base") and flanges 312 bent or otherwise extending from the base region 302 and substantially orthogonal to the base region 302. The skid plate 300 may be formed as a singular unit, meaning from a unitary piece of metal or other material.

The base region 302 includes a notch 304, the sides of which form lateral restraints of a tow point for the off road vehicle 100, once the skid plate 300 is welded to the tow frame member 210. Because of the notch 304, an opening is provided between the skid plate 300 and the tow frame member 210, defining a tow hook mount for the off road vehicle 100. The notch 304 forms prongs 306 in the base region 302 that may be welded or otherwise attached to the tow frame member 210 to form the tow point. See for example FIG. 7.

The flanges 312 are at opposing edges which are lateral relative to the edge forming the tow point of the base region 302. Each of the flanges 312 includes at least one attachment point 316 to receive fasteners to couple to the powertrain component 204. Each attachment point 316 is formed at an upper rearward corner (i.e., at the head of the prow shape) of the respective flange.

Figure 5:
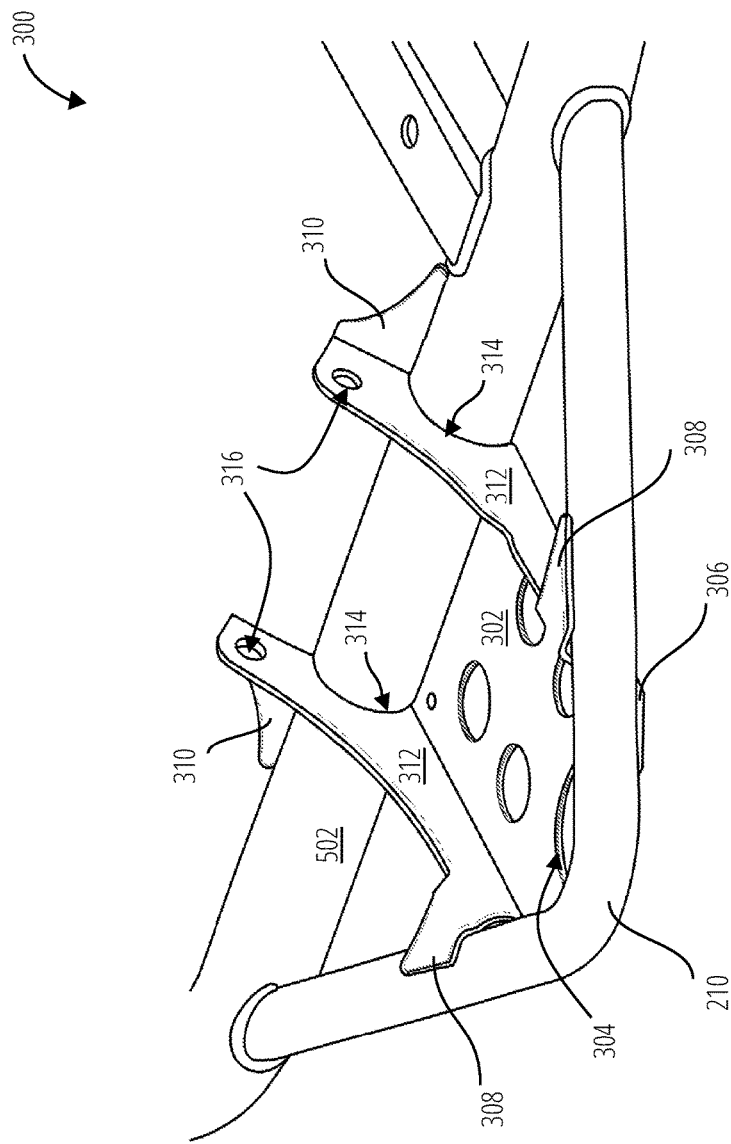
FIG. 5 is a top perspective view of the skid plate 300 mounted to the tow frame member 210 and to the vehicle frame member 502.
Figure 6:
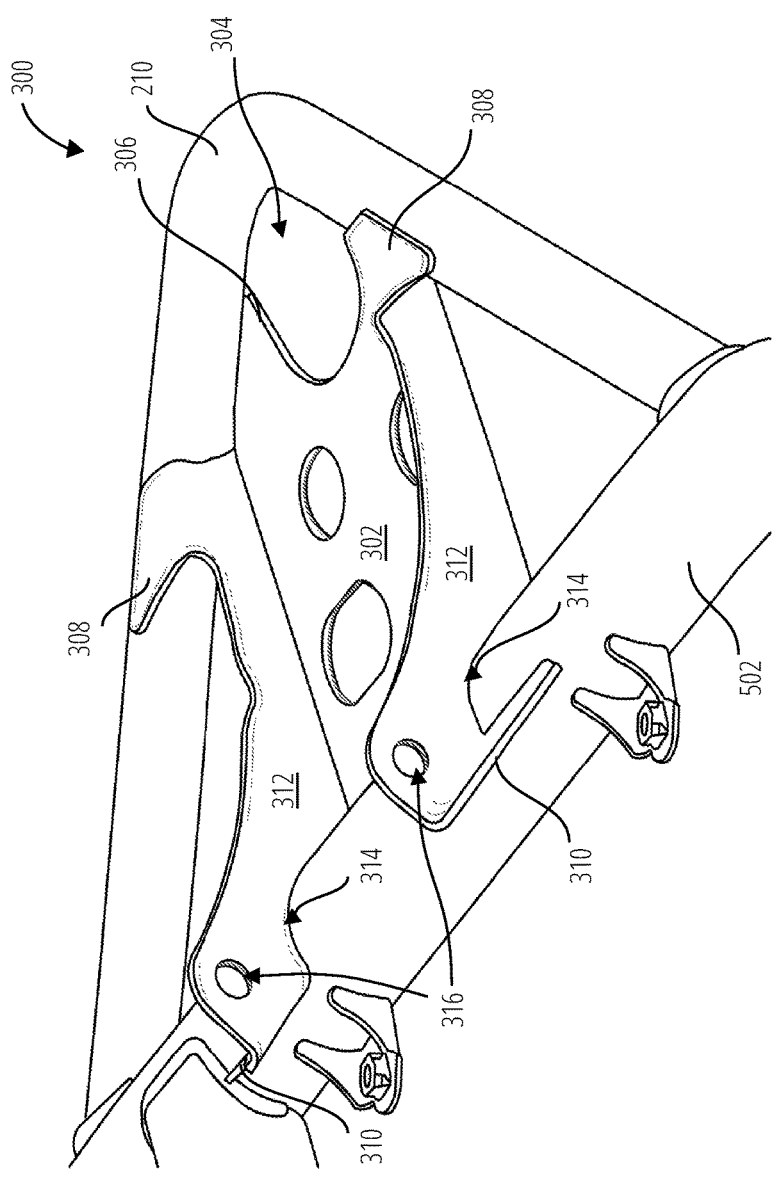
FIG. 6 illustrates the skid plate 300 mounted to the vehicle frame member 502 and to the tow frame member 210 in another view.
Figure 7:
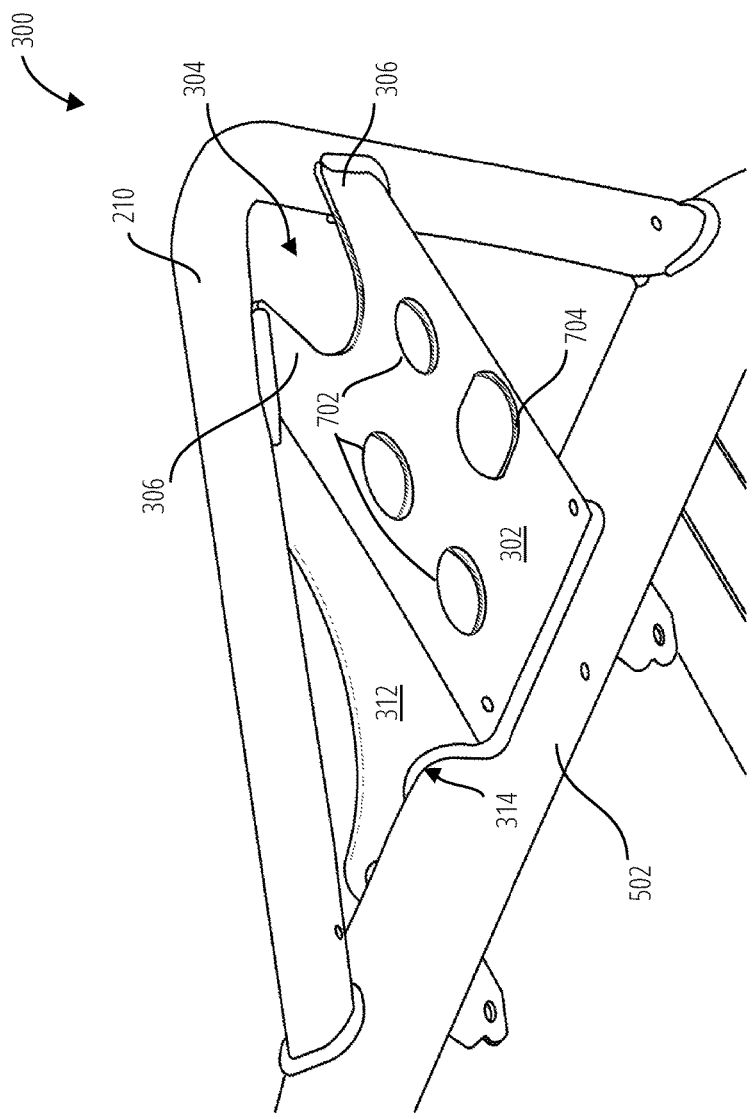
FIG. 7 illustrates the skid plate 300 mounted to the tow frame member 210 and to the vehicle frame member 502 in yet another view.

Referring now to FIGS. 5-7, each attachment point 316 includes a recess 314 to receive a vehicle frame member 502 of the off road vehicle 100. Each recess 314 is formed at a junction of the attachment point 316 and the base region 302, as an arch rising from the base region 302 toward the head of the prow shape formed by each of the flanges 312. The recess 314 in the flanges 312 may typically be welded to the vehicle frame member 502 of the off road vehicle 100. Each of the flanges 312 has a first protrusion 308 bent or otherwise extending from a first end of the flange, and a second protrusion 310 bent or otherwise extending from a second end of the flange. Each first protrusion may be welded to the tow frame member 210, and each second protrusion 310 may be welded to the vehicle frame member 502. Because the protrusions are formed from thin material, typically steel, they may be considered to have an extent in a two dimensional plane. In the skid plate 300 embodiment, the first protrusion 308 for welding to the tow frame member 210 extends in a plane substantially orthogonal to a plane that the second protrusion 310 (for welding to the vehicle frame member 502) extends within.

The vehicle frame member 502 and the tow frame member 210, once joined by welding, may form a single combined frame member, with the vehicle frame member 502 being a lateral portion of the combined frame member and the tow frame member 210 being a substantially V shaped portion of the combined frame member. Once the skid plate 300 is welded to the combined frame member, a tow hook mount is formed that also restrains the tow hook laterally in the space bordered by the notch 304 and the tow frame member 210.

The flanges 312 each extend (along direction D2) to an increasing extent from the base region 302 along a direction D1 from a forward area (where the notch 304 is formed) of the base region 302, toward a rearward area (where the recess 314 is formed) of the base region 302. This increasing extent from front to rear, together with the inverted arch shape of the top edge of each flange 312, forms the prow shape of the flanges 312. The first protrusions 308 are thus formed at a tail of the prows (closer to the forward area of the base region 302) and the second protrusions 310 are formed at the heads of the prows. The attachment point 316 to the powertrain component 204 is also at the head of the prow.

Each first protrusion 308 extends outward from the flanges 312 and is substantially parallel to the base region 302. Each second protrusion 310 extends outward from the flanges 312. The first and second protrusions are thus formed at opposite ends of the flanges 312. The attachment points 316 to the powertrain component 204 are more proximal to the second protrusions 310.

Referring to FIG. 7, strategically placed lightening holes 702 reduce the weight of the skid plate 300 without compromising its structural integrity. The skid plate 300 also includes an access port 704 to an oil drain plug in the powertrain component 204.

Figure 8:
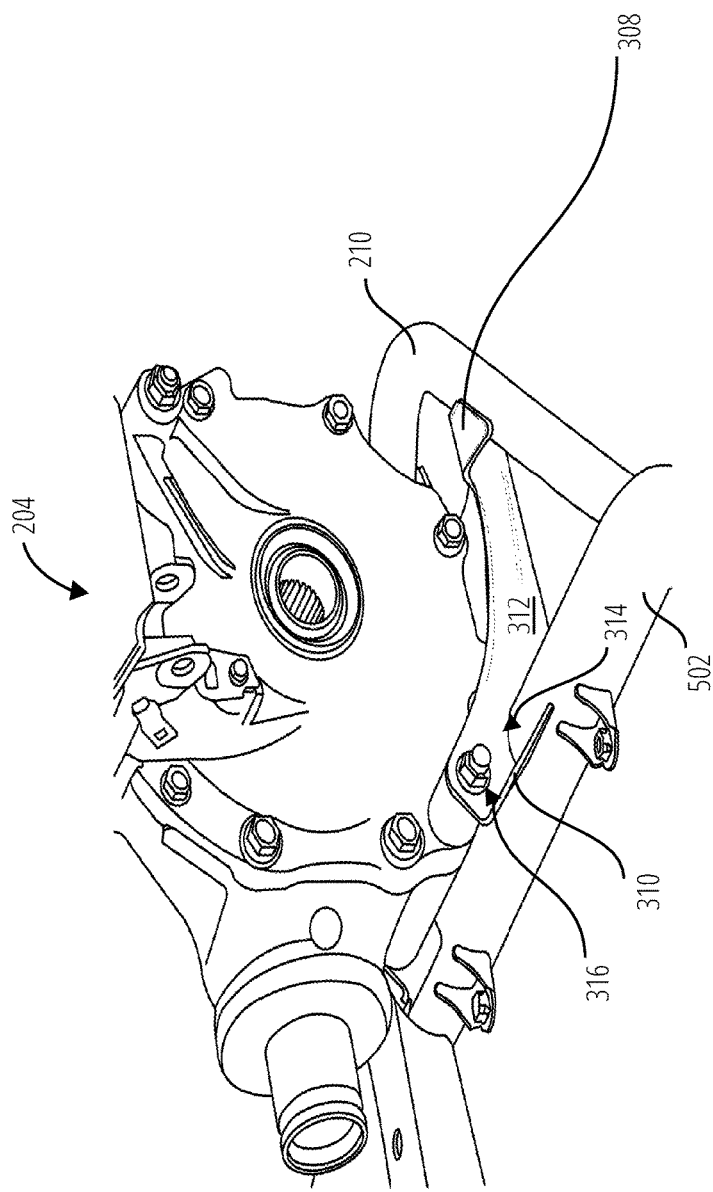
FIG. 8 illustrates the powertrain component 204 protected by the skid plate 300.
Figure 9:
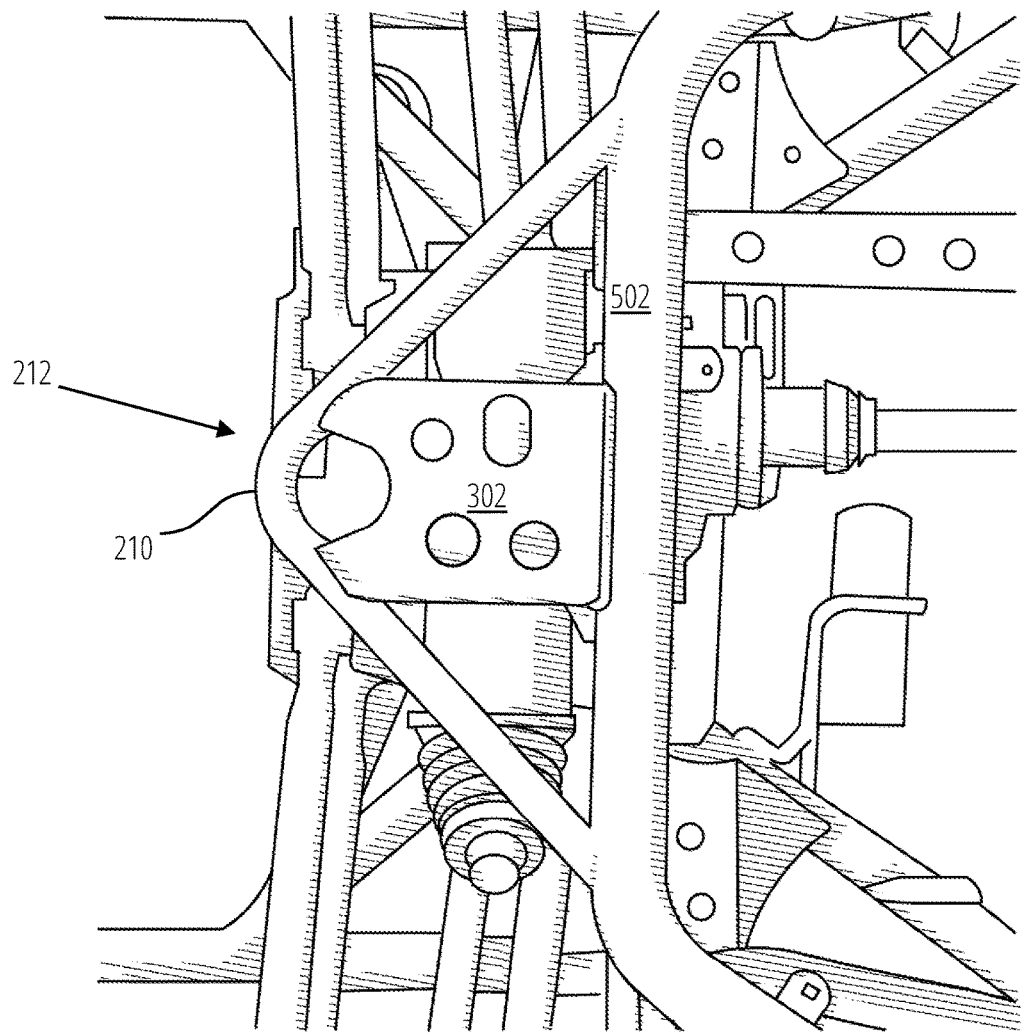
FIG. 9 illustrates a bottom view of the powertrain component 204, skid plate 300, tow frame member 210, and vehicle frame member 502.
Figure 10:
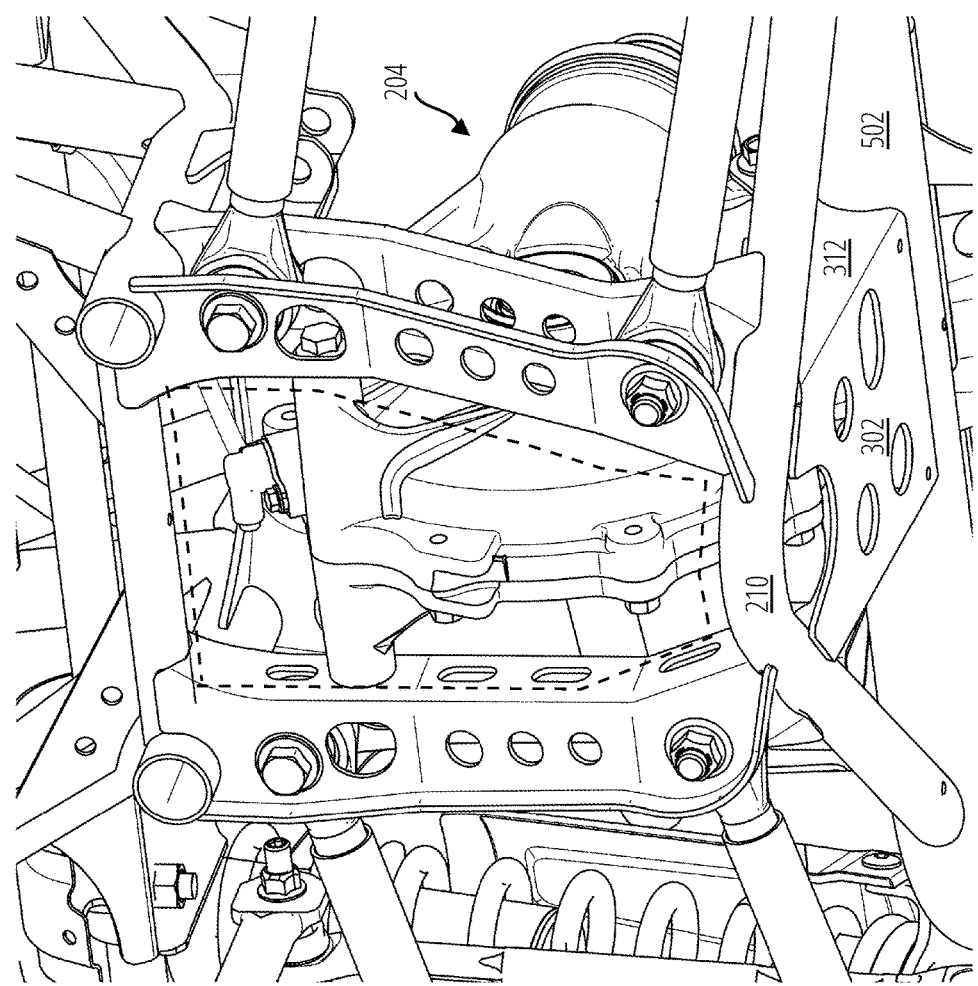
FIG. 10 illustrates a lower perspective view of the powertrain component 204, tow frame member 210, vehicle frame member 502, and skid plate 300.

FIGS. 8-10 illustrate the powertrain component 204, skid plate 300, tow frame member 210, and vehicle frame member 502 assembled in various aspects.

It will be understood that the skid plate 300 of the present disclosure is depicted to protect a powertrain component 204. However, the skid plate 300 may alternatively be configured to protect other features, such as a fuel tank, for example.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A mounting structure for a vehicle, the mounting structure comprising:
    a frame member comprising a tow frame member; and
    a skid plate attached to the frame member, the skid plate having a notch on an end;
    wherein an opening is defined by the skid plate at the notch and the tow frame member thereby collectively defining a tow hook mount.

2. The mounting structure of claim 1, the frame member further comprising a lateral extending portion attached to a rear of the skid plate, and wherein the tow frame member has a substantial V shape arranged such that an apex of the tow frame member is positioned at the notch at a front of the skid plate.

3. The mounting structure of claim 1, wherein the skid plate forms a pair of prongs on opposite sides of the notch, and wherein the prongs are attached to the tow frame member.

4. The mounting structure of claim 2, the skid plate comprising flanges on opposite sides, the flanges each comprising a recess to receive the lateral extending portion of the frame member.

5. The mounting structure of claim 4, the flanges each formed into a prow, a head of each prow comprising an attachment point to a powertrain component of the vehicle.

6. A mounting structure for a vehicle, the mounting structure comprising:
    a frame member;
    a skid plate comprising:
        a base region comprising a forward area and a rearward area;
        the forward area comprising a central notch forming lateral restraints of a tow point for the vehicle; and
        the base region comprising a plurality of flanges each comprising a recess to receive a portion of the frame member.

7. The mounting structure of claim 6, the flanges each comprising at least one attachment point to receive fasteners to couple to a powertrain component.

8. The mounting structure of claim 6, each flange comprising a first protrusion extending from a first end of the flange and a second protrusion extending from a second end of the flange.

9. The mounting structure of claim 6, each of the flanges extending past the rearward area of the base region to form a prow.

10. The mounting structure of claim 6, each attachment point formed at an upper rearward corner of the flange.

* * * * *